(12) United States Patent
Schmidt

(10) Patent No.: US 8,297,909 B2
(45) Date of Patent: Oct. 30, 2012

(54) WIND TURBINE

(76) Inventor: Eric Schmidt, Wichita, KS (US)

(*) Notice: Subject to any disclaimer, the term of this patent is extended or adjusted under 35 U.S.C. 154(b) by 370 days.

(21) Appl. No.: 12/765,491

(22) Filed: Apr. 22, 2010

(65) Prior Publication Data

US 2010/0270799 A1    Oct. 28, 2010

Related U.S. Application Data

(60) Provisional application No. 61/171,665, filed on Apr. 22, 2009.

(51) Int. Cl.
*F03D 11/00* (2006.01)
(52) U.S. Cl. ............................................. 415/1; 290/55
(58) Field of Classification Search ................ 415/232; 290/55
See application file for complete search history.

(56) References Cited

U.S. PATENT DOCUMENTS

| | | | |
|---|---|---|---|
| 2,214,411 A * | 9/1940 | Evans | 40/441 |
| 4,018,051 A | 4/1977 | Gay | |
| 4,321,476 A | 3/1982 | Buels | |
| 6,043,565 A * | 3/2000 | Les Strange | 290/55 |
| 6,798,082 B1 * | 9/2004 | Chen | 290/55 |
| 6,877,948 B2 | 4/2005 | Cutcher | |
| 7,839,010 B2 * | 11/2010 | Harvey | 290/55 |
| 2006/0037319 A1 | 2/2006 | Kaufman | |
| 2007/0210585 A1 * | 9/2007 | Korner | 290/55 |
| 2008/0265584 A1 * | 10/2008 | Teng | 290/55 |
| 2011/0164977 A1 * | 7/2011 | Vallejo | 416/145 |

FOREIGN PATENT DOCUMENTS

GB    2460020 A  * 11/2009
JP    59090775 A  *  5/1984

* cited by examiner

*Primary Examiner* — Joseph Waks
(74) *Attorney, Agent, or Firm* — Lathrop & Gage LLP

(57) ABSTRACT

A wind turbine that is mounted on a corner of a building and has a shaft that extends upward and outward from the corner, where the turbine blades are located, and the resulting rotation of the shaft is used for some power consumption purpose in our outside the building.

11 Claims, 4 Drawing Sheets

WIND TURBINE

RELATED APPLICATIONS

This application claim priority and benefit of U.S. Provisional Patent Application No. 61/171,665, filed Apr. 22, 2009, the disclosure of which is incorporated herein.

BACKGROUND OF THE INVENTION

1. Field of the Invention

The invention relates generally to the field of harnessing wind to generate electricity. More specifically, the invention relates to the field of locating wind-powered turbines on or around buildings or other structures.

2. Description of the Related Art

Wind turbines are known in the art and are used to convert the kinetic energy existing in wind into rotational mechanical energy using vanes or blades. Wind causes the blades of a wind turbine to spin, and the mechanical energy produced thereby can be used for a variety of purposes. These purposes include using the mechanical energy to cut lumber, grind stones, pump water etc. The mechanical energy created by the spinning of the blades can also be converted into electricity. For example, the blades of a wind turbine may be coupled to a shaft that rotates as the blades spin, and the shaft can be mechanically connected to an electrical generator.

It is known in the art to place the wind turbines in different areas. For example, U.S. Patent Application Publication No. 2006/0037319 made by Kaufman discloses a wind turbine that is installed onto a building. U.S. Pat. No. 4,321,476 issued to Buels discloses a set of wind turbines that may be placed within a mountain pass to harness wind energy. Similarly, U.S. Pat. No. 6,877,948 issued to Cutcher discloses a wind turbine that may be built onto the top of a roof.

As noted by U.S. Pat. No. 4,018,051, winds of greater velocity are desirable for wind turbines because these winds possess greater amounts of kinetic energy. It is known in the art to maximize the wind flow by structuring buildings such that they concentrate the wind flow into a narrow corridor to be utilized by a wind turbine as disclosed in U.S. Pat. No. 6,041,596 issued to Royer.

SUMMARY

A wind turbine system for converting the kinetic energy of wind into rotational mechanical energy is disclosed. The wind turbine system includes a shaft that is mounted onto a corner of a building. In embodiments, the corner of the building has three defined edges. The shaft is installed through the point at the corner at an angle. A plurality of blades are coupled to the shaft. Each blade has a leading edge and a trailing edge. Each blade also has a convex side and a concave side. The blades spin upon the impingement of air on the concave side of one or more blades. The blades, in embodiments, rotate in a generally conical plane about the corner. The blades are coupled to the shaft such that the leading edge of each blade can mate with one of the edges of the building.

In one embodiment, the leading edges of each blade is substantially parallel with (but clears) each of the three edges of the building. The shaft to which the blades are coupled rotates along with the spinning blades. The rotational mechanical energy generated by the shaft can be utilized for a variety of purposes, such as to compress air in air compressors, to generate electricity or for other known purposes.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
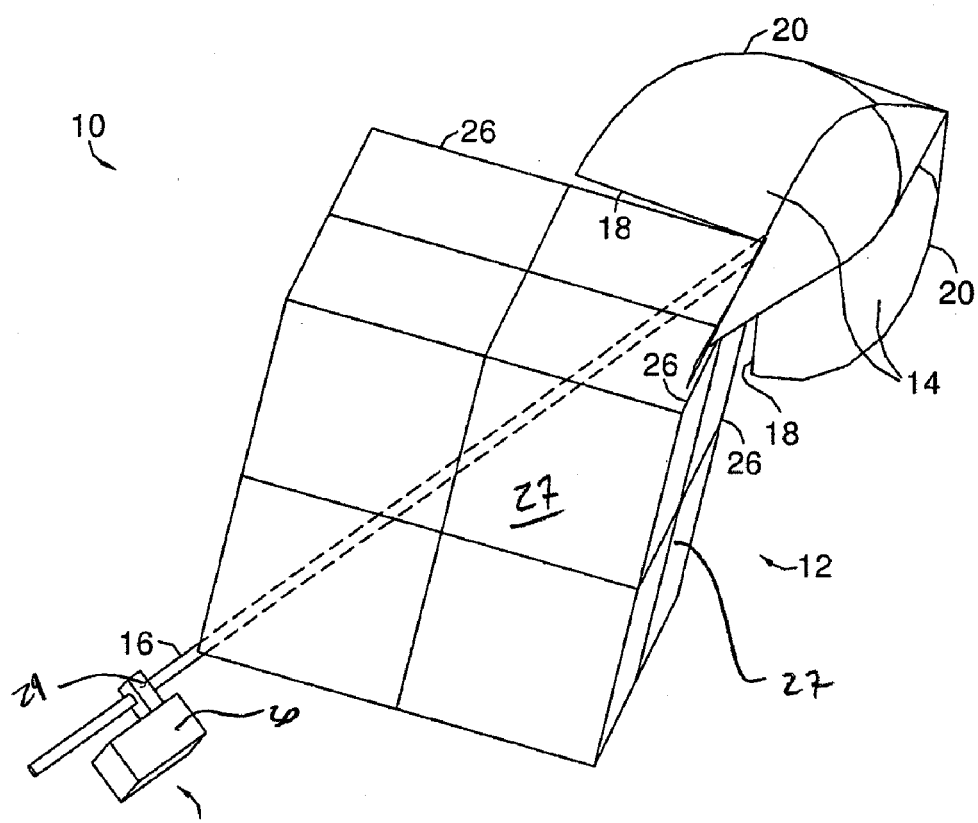
FIG. 1 is a perspective view showing an embodiment of the invention mounted on a building corner.
Figure 2:
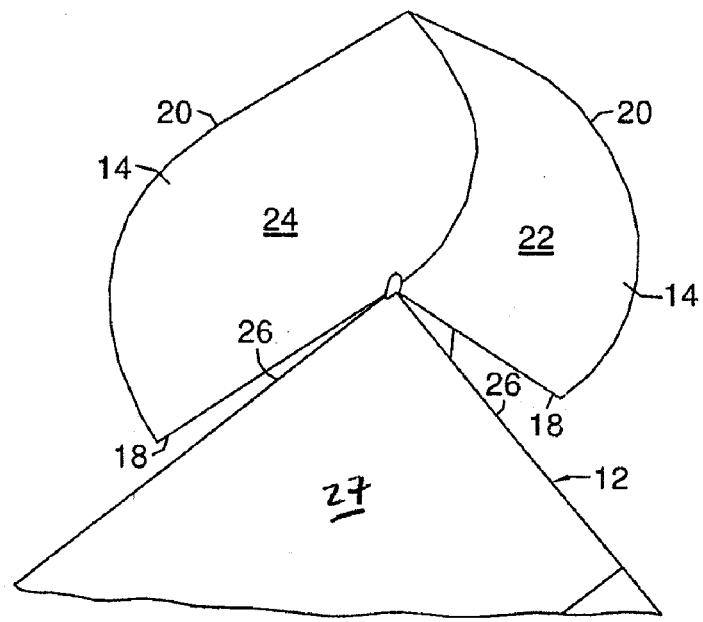
FIG. 2 shows a perspective view of the turbine from below.
Figure 4:
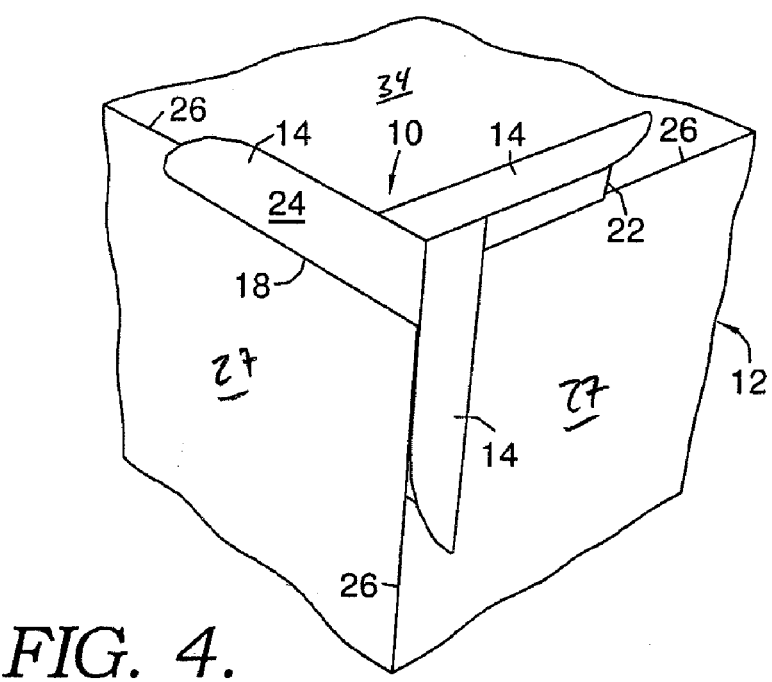
FIG. 4 is a perspective view of the turbine from above.

Embodiments of the present invention provide systems and methods for generating energy from wind. FIG. 1 is a perspective view depicting a wind turbine system on a building structure 10. A typical corner is defined by three converging edges all marked as 26, between three faces 27 of the building. In FIG. 4, all three edges 26 can be seen.

Structure 12 is shown as being a building in the figures, but it would also be possible to mount the arrangement on other objects, e.g., other nonmoving masses, vehicles, or other moving objects. The turbine blades 14 exist on a shaft 16.

Figure 5:
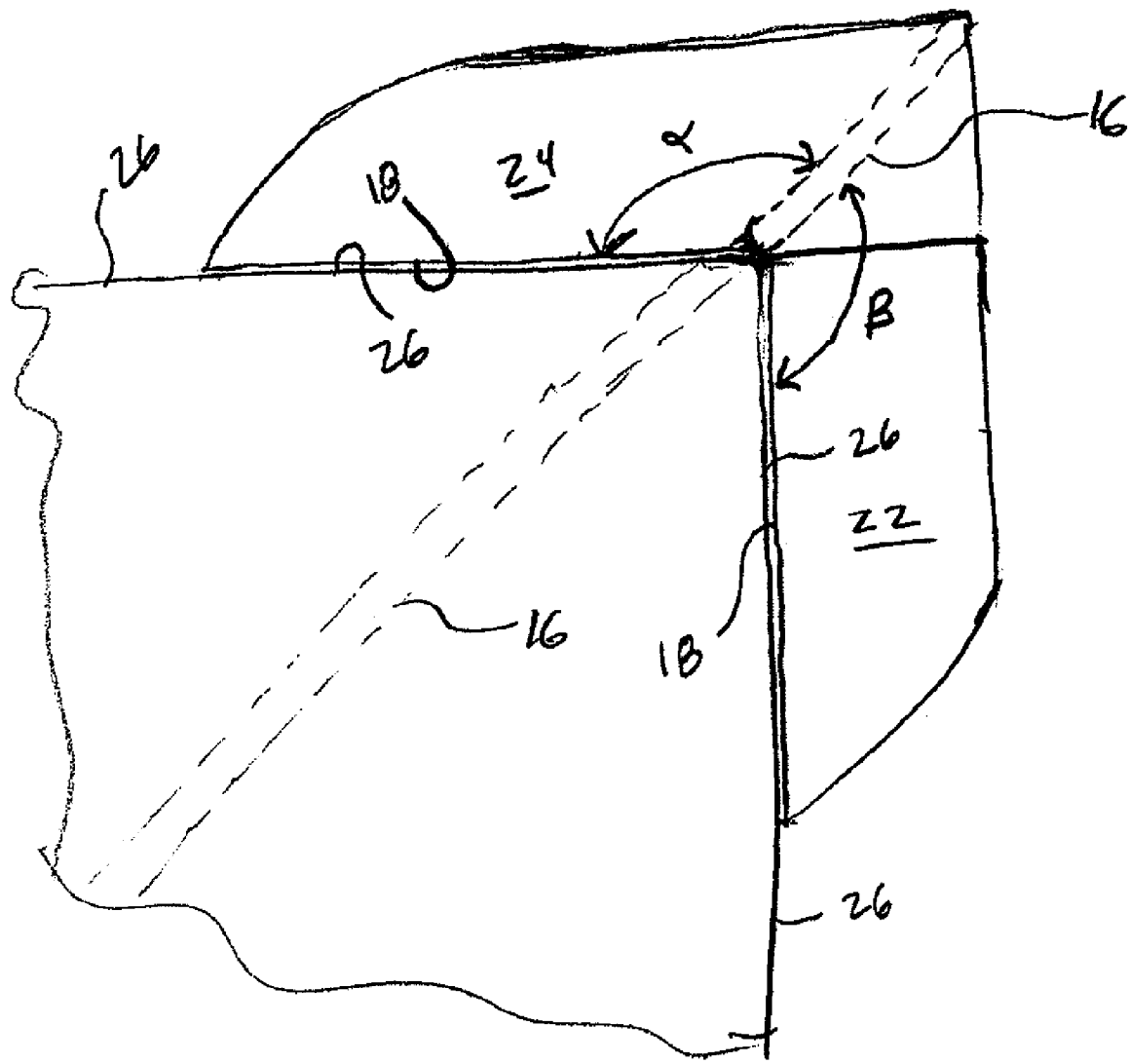
FIG. 5 is a side view of the turbine.

As shown in the figures, each of blades 14 has a concave high-pressure side 22, a convex low-pressure suction side 24, an inner edge 18, and an outer edge 20. In the FIGS. 1-5 embodiments, each inner edge 18 mates up with a respective one of a plurality of building edges 26 defined at a corner of structure 26. As can be seen in FIG. 5, each of inner blade edges 18 are adapted to barely clear each of edges 26 upon rotation at the interface between each of these edges 18 and the building edges 26. Thus, in this embodiment, the three inner edges 18 rotate on shaft 16 in a conical plane around the corner. It should be noted, however, that although FIGS. 1-5 show an embodiment where the inner blade edges 18 edges are opposed to and parallel with the edges of the building 26 when the turbine is so positioned, other embodiments exist in which the inner edges 18 of the turbine are skewed away from the building corner edges 26 so that they clear the building structures by an even greater extent.

It should be noted that although the building edges 26 in the drawings are shown as being truly straight, that different configurations could exist where the appear and are configured differently than shown in FIGS. 1-5. See, e.g., that in the building shown in FIG. 6 that the edges have eves and other irregular patterns that are not true corners. The use of the term edges, thus, should not be construed as requiring perfect lines.

Figure 6:
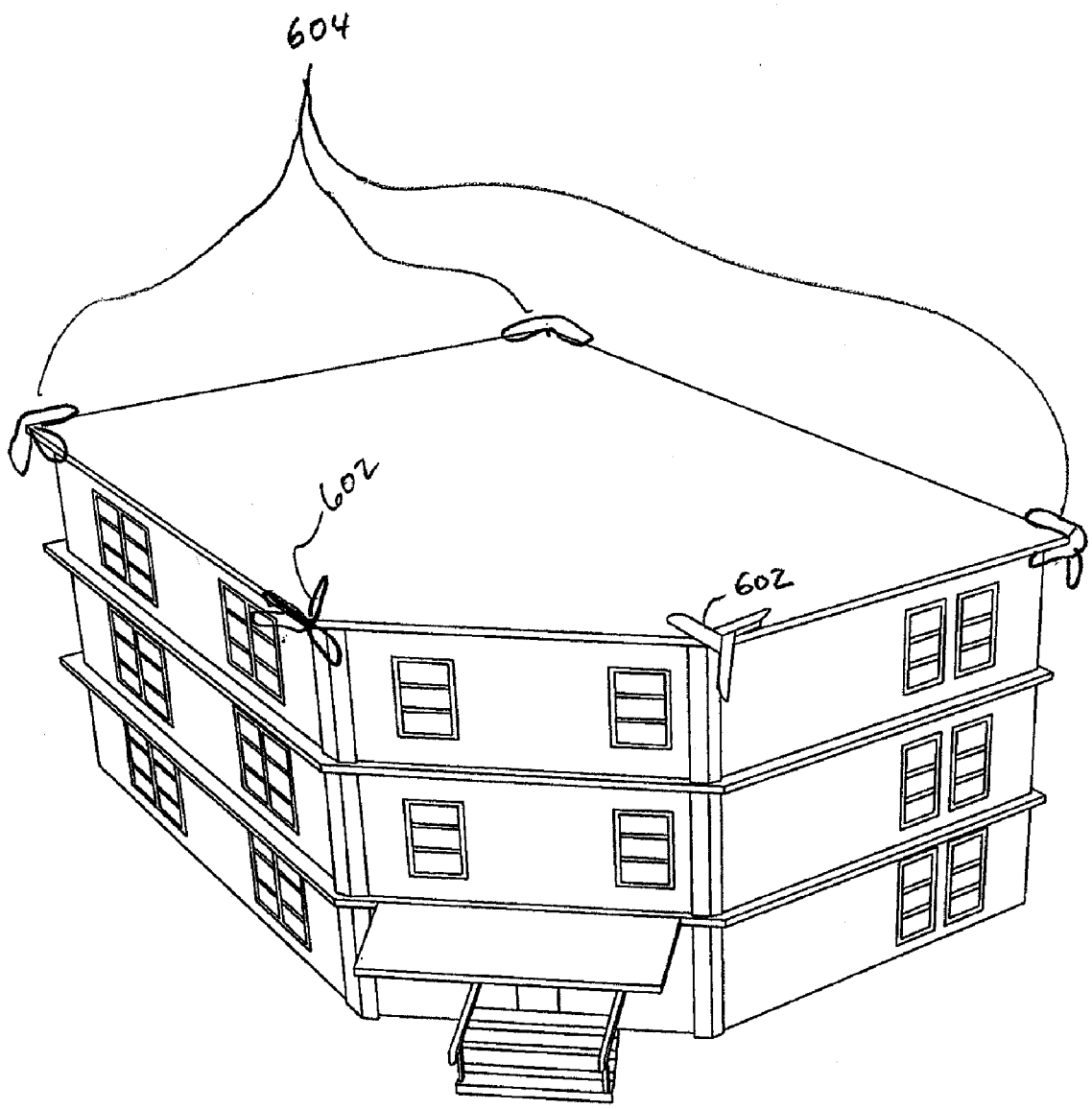
FIG. 6 is a perspective view of multiple turbines on a building.

Also shown in FIG. 6 is that the corners do not have to be perfectly 90 degrees for the turbines to be used. For example, the two forward turbines 602 shown in FIG. 6 are on 135 degree corners whereas the rear turbines 604 are on 90 degree corners. Thus, it is evident that the turbine can be configured to accommodate different corner types.

The faces 27 at the building corner are not likely planar in reality, although shown as being so in the FIGS. 1-5 embodiments. All should understand that real buildings have surfaces near corners can take many different shapes, most of which are substantially planar, but almost never exactly planar. For example, the typical buildings on which the wind turbines in this application can be used have windows and numerous other features causing the faces to be irregular and nonplanar.

Thus, references to the terms faces or surfaces to describe these features should not be construed as requiring that these surfaces be planar unless specified that way.

The turbine system here is mounted on our about the corner of the building on a shaft. As can be seen in FIGS. 1 and 5, the shaft 16 points up and away from the corner of the building. It can also be seen that, relative to the buildings edges, the shaft is at obtuse angles relative to each building edge. E.g., see obtuse angles α and β in FIG. 5. Even more specifically, the obtuse angles of the shaft relative to each of the first edge, a second edge, and a third edge, are equal or substantially equal as shown. It is preferred that the shaft be at obtuse angles relative to each edge when in the rotational position shown in FIGS. 4 and 5. This causes each blade to be equally angled relative to the corner edges. But a skewed shaft 16 is also possible. Regardless, the blades should be mounted such that the inner edges 18 are able to clear the building edges 26 during rotation. Unless specifically expressed, references to the shaft positioning angles being obtuse, or the shaft being obtusely positioned, or other like language should be construed to mean only some obtuse angle. Not the precise ones shown in the disclosed embodiments here.

Similarly, it is also disclosed herein that embodiments exist where the angles of the inner edges of the blades 18 are skewed outward, e.g., to be at right angles to shaft 16 or even skewed outward so as to be past 90 degrees. Thus, the extent of convergence of these inner edges should not be considered limiting unless otherwise expressed. It is contemplated that numerous blade configurations could exist about shaft 16 that would fall within the scope of this invention. It is important, of course, that the blades do not interfere with any portion of the building when in any position during rotation.

It should also be mentioned that the size of the turbine blades could, in embodiments, be much greater (or smaller) that what is shown. For example, referring to FIG. 5, it is possible that the blades would be so large that they would cover almost all three floors in the building shown in FIG. 6. The blades would have to clear the ground during rotation, of course, but other than that, there is not a real restriction on size.

Although the figures all show three blades in use, it is also possible that the invention could be executed with any number of blades. The number of blades used does not necessarily have to equal the number of edges around the corner. Thus, the number of blades should not be considered limiting unless a number is precisely expressed in any given claim.

Figure 3:
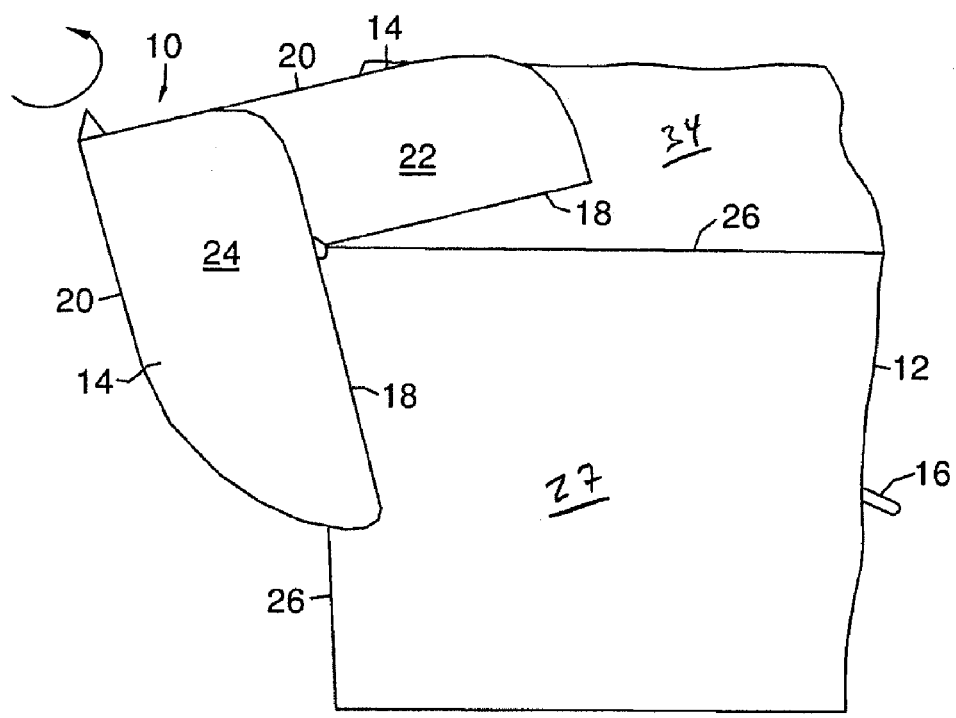
FIG. 3 is a view of the turbine from one side and slightly above.

Upon impingement of air upon the blades 14 of turbine 10, shaft 16 will be rotated, e.g., in the direction indicated in FIG. 3. The mechanical energy then existing in rotating shaft 16 can then be used for a variety of purposes. For example, shaft 16 can be mechanically connected (through gears or some other arrangement to an electrical generator for the purpose of generating electricity. This electricity (using known power management systems) be used to maintain a charge in a battery array, capacitor arrangement, or other means to use the power generated for equipment, lighting, or other power consuming devices in the structure, or outside the structure.

Alternatively, the mechanical energy generated in shaft 16 could be mechanically linked to an air compressor for the purpose of using the mechanical energy for compressing air into a tank or other storage means. The pressurized air could then be used as a power source or for other purpose.

In other embodiments, the mechanical energy can be used for other known purposes other than generating electricity or compressing air, e.g., mechanical devices inside the structure or elsewhere.

It should also be noted, that the turbine blades 14 could also be adjusted to have variable pitch. In yet other embodiments, this variable pitch arrangement could be made to be automatically adjustable by a wind direction indicator.

In other embodiments, a plurality of fairings or guide vanes could be mounted onto the building structure, e.g., on the sides or elsewhere to ideally direct the wind into the blades to maximize spin.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A wind turbine system comprising:
   a shaft mounted on a corner of a building, the shaft obtusely skewed away from a first surface, a second surface, and a third surface of the building, said first, second, and third surfaces being proximate said shaft; and
   a plurality of blades coupled to the shaft such that said blades do not interfere with any of said first second and third surfaces, said blades causing said shaft to rotate upon the impingement of air.

2. The system of claim 1 wherein the shaft is connected to an electrical generator which uses the mechanical energy of the rotating shaft to generate electricity.

3. The system of claim 1 wherein the electricity generated is consumed, at least in part, in the building.

4. The wind turbine system of claim 1 wherein the shaft is connected to an air compressor which uses the mechanical energy of the rotating shaft to compress air.

5. The wind turbine system of claim 1 comprising:
   one or more guide vanes or fairings mounted onto the building to direct the air into the blades.

6. The wind turbine system of claim 1 wherein:
   the blades are coupled to the shaft in an adjustable arrangement such that the pitch of the blades can be varied.

7. The wind turbine system of claim 6 wherein:
   a wind direction indicator is used to automatically adjust the pitch of the blades.

8. A wind turbine system on a building, the building having a corner defining a first edge, a second edge, and a third edge, the turbine comprising:
   a shaft mounted on the corner of a building, the shaft pointed away from the corner obtusely relative to said first, second, and third building edges;
   a first blade;
   a second blade;
   a third blade;
   each of the first, second, and third blades having a leading edge, a trailing edge, a concave side and a convex side; and
   the first, second, and third blades, upon impingement of air upon the concave side of each of said first, second, and third blades, causing the blades to rotate the shaft.

9. The system of claim 8 wherein the leading edges of the first second and third blades are substantially parallel with, but do not engage said first, second, and third edges of the building when in a position during rotation.

10. The system of claim 8 wherein said shaft is mounted such that it is an substantially equal obtuse angles relative to each of the first, second, and third building edges.

11. A wind turbine for a building comprising:
   a shaft extending down and into a corner of said building and extending upward and away from the corner of the building;
   a plurality of blades mounted on the shaft outside the building; and
   a power-converting mechanism located inside the building, the mechanism converting the energy in said rotating shaft into some other useful form.

* * * * *